April 19, 1960 N. J. LEEDY ET AL 2,933,590
STREAM FEEDER AND METHOD OF MAKING SAME
Filed March 18, 1958
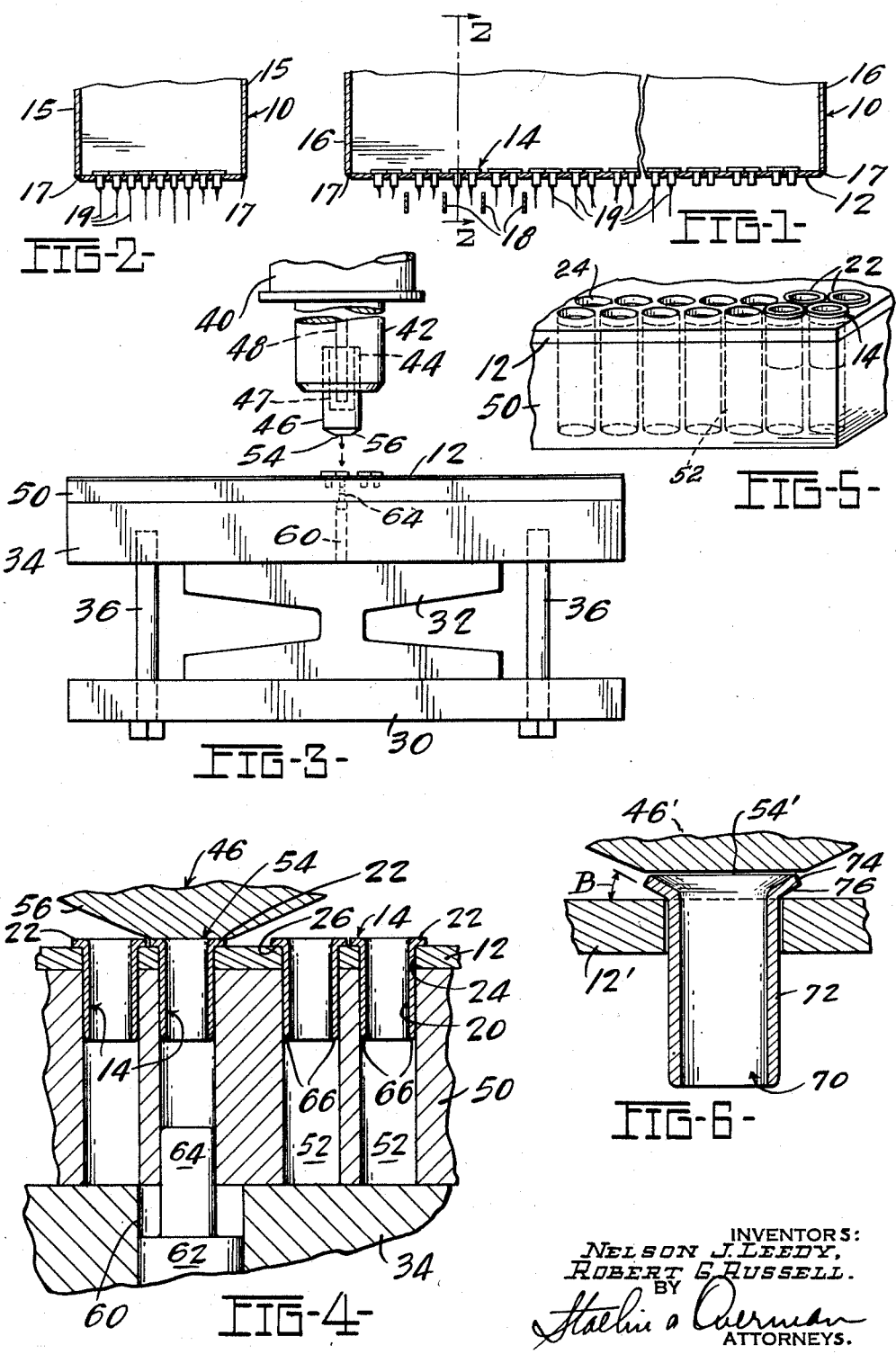
INVENTORS:
NELSON J. LEEDY,
ROBERT G. RUSSELL.
BY
ATTORNEYS.

United States Patent Office 2,933,590
Patented Apr. 19, 1960

2,933,590
STREAM FEEDER AND METHOD OF MAKING SAME

Nelson J. Leedy, Newark, and Robert G. Russell, Granville, Ohio, assignors to Owens-Corning Fiberglas Corporation, a corporation of Delaware Application March 18, 1958, Serial No. 722,202

11 Claims. (Cl. 219—107)

This invention relates to feeder devices or bushings employed for feeding a plurality of streams of heat-softened mineral material such as glass for processing into fibers or filaments and to a method of welding tubular members or orifice tips in a wall of the feeder device or bushing.

In processes of forming heat-softenable mineral materials, such as glass or the like, into fibers or filaments and especially continuous filaments usable for textiles, it is conventional practice to utilize a receptacle, feeder or bushing wherein the bottom wall is formed with a plurality of orifices through which the heat-softened material flows to provide a plurality of streams which are attenuated into fibers or continuous filaments.

Heretofore, the orifices have been formed in a bottom wall of a feeder fashioned of platinum rhodium or similar metal capable of withstanding high temperatures by impressing indentations in the wall to form raised portions or dimples at the regions at which it is desired to provide orifices and each raised portion built up by a tedious and time consuming manual operation of flame fusing drops or globules of platinum rhodium to the projections and coining or shaping each projection to a circular cylindrical shape and afterwards drilling and sizing an opening in each built-up projection to form a comparatively short tubular tip through which heat-softened glass may be discharged in a minute stream.

In the manufacture of textiles, it is desirable that a textile strand, thread or yarn be formed embodying a large number of extremely fine continuous filaments, each strand, thread or yarn usually embodying from one hundred to four hundred or more filaments. In feeder receptacles or bushings embodying a large number of orificed feeder tips or built-up projections, the tips are disposed in close relation and during the forming of the raised portions the fusion of material thereto various stresses are set up in the floor or bottom wall containing the orifices which, in subsequent use of the feeder or bushing at high temperatures cause warping and sometimes fracturing of the bushing.

The fabrication of a single bushing requires many hours of highly skilled labor, as each tubular tip or member of the bushing must be identical with all of the others in order to secure uniform streams of glass to form filaments of substantially uniform diameters.

Attempts have been made to manually weld lengths of small tubing to the floor of the bushing or feeder by a gas or flame process, but by reason of the extremely high temperature required to fuse platinum alloy, the tubes became warped and distorted because of nonuniform heating and difficulties were encountered in forming an effective seal between the tubular member and the bushing floor which resulted in leakage of the glass through defective welds. Furthermore, unequal fusion of the metal of the short tubes resulted in distorted tips of unequal length and hence a nonuniformity in the size of streams flowing through the orifices of the tubes.

The present invention embraces the provision of a feeder or bushing wherein tubular members are embodied as stream feeding means and to a method of electrically welding the tubular members in suitable openings formed in a floor or wall of the feeder or bushing.

An object of the invention is the provision of a feeder receptacle or bushing formed of platinum, platinum alloy or metal having similar characteristics embodying orifice means in the form of flanged tubular members fashioned of the same metal as that of the receptacle wherein adjacent surface areas of the flanges and a wall of the receptacle are fused or integrated to provide effective sealed junctures between the members and the receptacle.

An object of the invention embraces a method of electric resistance welding of flanges formed on tubular tips or orifice members to a surface of a feeder wall or floor whereby a satisfactory and uniform weld may be obtained throughout a circular region of contact of the flanges with the feeder and an effective seal obtained between the flanged members and the feeder wall.

Another object of the invention is the provision of a method of resistance welding flanges of tubular tips or eyelets to the feeder wall wherein welding heat is generated by resistance to current flow at a region of contact of the flanges with a surface of the feeder wall.

Another object of the invention is the provision of a method of resistance welding flanged tubular members or eyelets in openings in a feeder wall wherein the tubular members may be arranged in close relation whereby a large number of tubular tips or eyelets may be disposed and arranged in a comparatively small surface area of a feeder wall.

Another object of the invention resides in a method of resistance welding of flanged tubular members to a bushing wall in which the welding operations may be performed in short periods of time and wherein the tubular members are not distorted and welding stress reduced to a minimum.

Another object of the invention is the provision of a method of welding tubular members to a feeder formed of platinum alloy wherein the weld time is of short duration and is controllable and the welded or fused regions of the tubular members held under pressure in contact for a controlled short period of time after interruption of the welding current to obtain an improved fusing of the metal and an effective seal between the tubular members and the feeder wall.

Another object of the invention through the use of the method is the minimization of the liability of the feeder tip section to fracture through the decreased tendency of warping or distortion of the feeder resulting from welding operations.

Another object of the invention embraces a method of electrically welding orifice tips or eyelets in a feeder component or plate wherein pressure is exerted upon the orifice tips prior to the welding operation and pressure maintained on the orifice tip for a comparatively short period of time after the welding current is interrupted, the duration of the pressure periods and the duration of the welding time being adjustable to secure an effective weld or fusion of the adjacent surfaces of the eyelets and the feeder component or plate.

Further objects and advantages are within the scope of this invention such as relate to the arrangement, operation and function of the related elements of the structure, to various details of construction and to combinations of parts, elements per se, and to economies of manufacture and numerous other features as will be apparent from a consideration of the specification and drawing of a form of the invention, which may be preferred, in which:

Figure 1 is a longitudinal sectional view through a bushing or feeder of the invention utilized for flowing streams of molten mineral material illustrating the arrangement of orificed members or tips in the floor of the feeder or bushing;

Figure 2 is a vertical transverse sectional view through the feeder taken substantially on the line 2—2 of Figure 1;

Figure 3 is a fragmentary elevational view showing a portion of an apparatus for effecting welding operations for welding the orifice tips to a plate or member forming a bottom wall of the feeder;

Figure 4 is an enlarged fragmentary sectional view showing several orifice tips or eyelets in position to be resistance welded to a feeder plate;

Figure 5 is a fragmentary isometric view of a portion of a feeder plate and supporting fixture illustrating the positioning of flanged orifice members in openings in the plate and fixture, and Figure 6 is a greatly enlarged sectional view illustrating a modified form of tubular orifice tip or eyelet construction and the relation of the flange portion of the orifice tip and the movable current conducting electrode preparatory to a welding operation.

While the method of the invention has particular utility in producing effective sealing welds between orifice members or tips formed of platinum or platinum alloy and a bottom wall or floor of a feeder adapted to contain heat-softened or molten mineral material such as glass which flows through the orificed members, it is to be understood that the method may be employed wherever it may be found to have utility in welding platinum or platinum alloys, palladium or similar materials.

Referring to the drawings in detail, and initially to Figures 1 and 2, there is illustrated a feeder or bushing 10 embodying the invention which is particularly adapted to contain heat-softened or molten mineral material such as glass, the lower wall or floor 12 being provided with means for flowing streams of the mineral material which may be processed or attenuated to filaments or fibers by conventional attenuating means. The floor or plate 12 of the feeder is provided with a plurality of openings which accommodate the flanged orifice members, tips or eyelets 14 which are welded to the plate 12 through the utilization of the method of the invention.

The feeder walls, the bottom plate 12 and the orifice members 14 are formed of materials capable of withstanding the intense heat of molten glass and such materials as platinum or platinum alloyed with rhodium or iridium are utilized for the purpose. The side walls 15 and the end walls 16 and the floor 12 are fashioned as individual plates which are welded together by flame or gas welding as at 17.

Feeders of the character illustrated are utilized particularly for flowing a large number of streams of glass which are attenuated into fine filaments subsequently processed or twisted into textile yarns or threads for textile uses. It is highly desirable to concomitantly form a substantial number of individual filaments from the streams discharged from the feeder for forming textile threads, yarns or strands. Hence, the floor 12 is provided with as many orifice tips or members as can be successfully incorporated therein and the number of orifices may be four hundred or more in a single feeder.

It should be noted in Figure 1 that the orifice members 14 are arranged in pairs of rows, the pairs being spaced to accommodate cooling plates or fins 18 disposed respectively between each two transverse rows of tips 14, the fins 16 absorbing heat from the glass streams 19 to stabilize the streams and render them of uniform temperature and viscosity in order to provide substantially uniform filaments or linear bodies.

The method of the invention provides for resistance welding of the orifice members or tips 14 to the feeder floor or plate 12 through the use of electric energy, the resistance to the current flow establishing intense heat at the region that a weld is to be effected between the flange of an orifice tip or member 14 and the feeder floor 12.

Each of the orifice tips 14 illustrated in Figures 1 through 5 is formed with a hollow or tubular body portion 20, one end of which is fashioned with an outwardly extending circular flange 22. The exterior diameter of the body portion 20 of the orifice tip or tubular member is of a dimension to be slidably received in an opening 24 formed in the feeder floor or plate 12.

The circular contacting areas or regions 26 of the flange 22 of each orifice member 14 with the plate 12 are welded or fused through the method of the invention to form an effective sealed joint between the flange of each eyelet or orifice member 14 and the adjacent surface of the plate 12 so that no leakage of glass or other molten material will occur at the region of the weld. Figure 3 illustrates a portion of an apparatus for carrying on or performing the welding and associated operations for welding the orifice tips to the bushing floor.

The arrangement shown in Figure 3 includes a frame 30, a bolster member 32 upon which is mounted a work support or platen 34, the latter being secured in position by means of bolts 36 extending through openings in the frame member 30. The work supporting member or platen 34 is preferably formed of copper or other metal having relatively high current conducting characteristics, the platen 34 being connected with a source of low voltage, high amperage current utilized for performing the welding operations.

Disposed above the platen 34 is a cylinder 40 carried by a frame portion (not shown) of the machine in which a piston is disposed for reciprocable movement along an axis normal to the surface of the platen 34, the piston being connected with an electrode holder 42. The lower central region of the electrode holder 42 is bored and threaded as at 44 to accommodate an electrode 46. Fluid pressure, such as compressed air, is admitted to the cylinder 40 by control means (not shown) for effecting reciprocation of the electrode holder 42 and the electrode 46 whereby the electrode may be moved into and out of welding engagement with the flanges 22 of the orifice tips 14.

The electrode 46 is provided with an interior chamber 47 connected by means of a tube or passage 48 with a supply of coolant such as water for maintaining the electrode 46 at a safe operating temperature. The electrode 46 is fashioned of copper or other suitable material. The electrode holder 42 is connected with conductors (not shown) arranged to conduct electrical energy to the electrode 46 for carrying on welding operations.

The plate 12, which forms a floor of the finished feeder or bushing 10 and prior to its assembly with the side and ends walls, is adapted to be supported upon a jig or fixture 50 which is also fashioned of copper or other high current conducting metal and which is provided with openings 52 registering respectively with the openings 24 formed in the floor plate 12 adapted to receive the orifice tips 14. The fixture plate 50 and the feeder plate 12 of the bushing construction are arranged in contiguous relation as shown in Figures 3 and 4, the orifice members or eyelets 14 having their body portions 20 extending through the registering openings 24 and 52 formed in the plate 12 and fixture 50 respectively.

The electrode 46 is provided with a work engaging portion or surface area 54 which is of planar shape normal to the axis of movement of the electrode, the surface 54 being preferably of circular shape or contour. The surface 54 is the terminus of a conically shaped portion 56 of the movable electrode 46 as shown in Figures 3 and 4, the angularity of the conical surface of portion 56 being about thirty degrees with respect to the plane of the surface 54 or of an angularity which will not effect contact of the surface with the flanges of adjacent tubular members. However, it is desirable to embody as much metal as possible in the frusto-conically shaped portion 56 so as to facilitate ample current flow to the member engaging surface 54.

The holder 42 carrying the movable electrode 46 is reciprocated by fluid pressure acting against a piston (not shown) contained in the actuator cylinder 40 to move the electrode into contact with a tubular member for effecting welding operations and for withdrawing the electrode after the completion of welding operations.

In order to properly position the fixture 50 whereby the tubular members may be successively brought into position in alignment with the axis of the electrode 46, the platen or support 34 is provided with an opening 60 which snugly receives a pin 62 formed with a tenon 64, the tenon projecting above the upper surface of the support 34 and adapted to extend into the opening in the fixture 50 occupied by a tubular member 14 in a position to be engaged by the electrode 46 preparatory to a welding operation. This arrangement is illustrated in Figure 4.

Suitable controls are provided for adjustably regulating the duration of time of current flow through the electrode, the flange 26, feeder plate 12, fixture 50 and current conducting support 34 for effecting a weld at the region 26 between the flange 22 of a tubular member 14 and the platinum plate 12. Adjustable controls are also provided for regulating the amount of current delivered to the electrode 46. Valve mechanism (not shown) adapted to control the flow of pressure fluid into and away from the fluid actuator is controlled by electrically operated means (not shown) intercalated with the control of the welding current to cause current flow at the proper time to effect a weld in the sequence of operations.

Controls are also provided for adjustably regulating the time of duration of pressure on the electrode during the periods immediately preceding and succeeding the current flow for the weld operation. The period in which pressure is exerted by the electrode against the tubular member just prior to the welding period is referred to herein as a "squeeze period" and the period of time following the cessation of the welding current is referred to as the "hold time." Electrically actuated adjustable controls are employed for these purposes and as they are of conventional character, they have not been shown herein.

The steps in the method of welding the tubular members in a plate 12 to be utilized as a stream flow region of a feeder are as follows: The platinum alloy plate 12 is first provided with the number of circular openings corresponding to the number of streams of molten material to be delivered from a feeder. These holes may be punched, drilled or otherwise formed in the plate. The perforated plate 12 is then mounted upon the fixture 50 with the openings in the plate 12 in registration with the openings in the fixture 50. The tubular members or eyelets 14 are inserted into the registering openings whereby the cylindrical bodies 20 of the tubular members or eyelets extend into the openings in both the plate and the fixture as in the position illustrated in Figures 3 and 4. The tubular members or eyelets may be assembled in the openings by manual operations or by a suitable feed chute (not shown).

The assemblage of plate 12, fixture 50 and tubular members 14 is then mounted upon the current conducting platen or table 34 with the positioning pin 64 extending upwardly into one of the openings 52 which is in vertical alignment with the electrode 46, the latter being elevated above the plate 12 as shown in Figure 3.

The operator then actuates a first control member (not shown) preferably of a foot operated pedal type. Depression of the first pedal control initiates movement of a valve for admitting fluid pressure such as compressed air above piston in the cylinder or actuator 40. The air pressure moves the piston, the electrode holder 42 and the electrode 46 toward the plate 12 bringing the circular face portion 54 of the electrode 46 into engagement with the upper face of the flange 22 of the tubular member 14 in alignment with the axis of the electrode. Figure 4 illustrates the electrode 46 in engagement with a flange 22. After the first control member is actuated to initiate downward movement of the electrode 46 to engage the same with the flange 22, the operator actuates a second control which may be a foot actuated pedal type (not shown) for initiating the welding cycle and other operations or steps in the method.

The actuation of the second control member initiates the following operations in sequence: The fluid pressure on the piston in the actuator 40 is maintained for a short period prior to the welding step referred to as the "squeeze time."

Thus in addition to the initial movement of the electrode 46 into engagement with a tubular member 14 upon actuation of the first control member, such pressure is maintained during the "squeeze time" so that an intimate contact is set-up or established between the electrode and the flange 22 of the tubular member and between the flange and the upper surface of the platinum plate 12. The duration of the "squeeze time" may be varied by regulating means (not shown).

When the selected "squeeze time" has elapsed, the automatic control of the welding current is actuated to complete a circuit through the electrode 46, the flange of a tubular member 14, feeder plate 12, fixture 50 and the current conducting platen 34 whereby current is caused to flow through the flange 22 and the plate 12. Due to the resistance between the adjacent contacting surface areas of plate 12 and flange 22, the metal of the flange and the adjacent metal of the plate 12 are heated to a temperature above the fusing temperature and are thus welded together.

In order to assure an effective weld throughout the entire contacting areas of the flange 22 and the plate 12, a "hold time" is maintained after the welding current is interrupted whereby pressure is maintained in the cylinder 40 and on the electrode 46 so that during the initial chilling or cooling of the fused material, pressure is maintained to assure a complete and effective integration or fusing of the adjacent surfaces of flange 22 and the plate 12.

At the expiration of the selected "hold time," mechanism for actuating the valve means controlling the admission of fluid under pressure into the actuating cylinder 40 is activated to admit fluid into the cylinder at the opposite side of the piston to elevate the electrode 46 out of engagement with the tubular element which has just been welded to the plate. As previously mentioned, the "squeeze time," the duration of flow of the welding current, and the "hold time" are adjustable.

It has been found that a "squeeze time" of approximately two seconds, a welding current flow period of approximately one-sixtieth of a second, and a pressure "hold time" of approximately two seconds, have produced effective resistance welds of the flanges of the tubular members to the plate 12. After each welding cycle of a tubular member is completed, the operator elevates slightly the fixture 50 which lifts the fixture 50 away from the locating pin 64. After the fixture is thus disengaged from the pin, the fixture may be moved to a new position wherein the pin 64 enters another of the openings 52 in alignment with an unwelded member 14. The operator then initiates a new cycle of operations by actuating the first control member to admit fluid pressure into the cylinder 40 above the piston to initiate movement of the electrode 46 toward engagement with the flange of an unwelded member 14. The second control member is then actuated and a second welding cycle completed as above described. These operations are continued until all of the flanges of the tubular members 14 have been welded to the adjacent regions of the plate 12.

The arrangements for controlling the "squeeze time,"

the "weld time" and the "hold time" are electrically controlled in a conventional manner and are manually adjustable to vary the durations of the periods of these operations.

The angularity of the portion 56 of the electrode is fashioned to provide as large a cross-section of the electrode at this region as possible, and allowing sufficient clearance from adjacent tubular members or tips 14 so that there will be no overlapping of welding of the flanges of adjacent tips. This is illustrated in Figure 4 wherein it will be seen that the diameter of the tip surface 54 of the electrode is just slightly larger than the diameter of a flange of a tip member to be welded to the plate 12.

It should be noted that the extremities of the body portions of the orifice tips 14 are chamfered or curved inwardly as illustrated at 66 to facilitate entry of the tips into the openings in the plate 12 and the fixture 50. The diameters of the body portions 20 of the tips and the openings in the plate 12 may be such that the bodies 20 are slidably yet frictionally retained in the openings preparatory to the welding operations.

As a typical example, the following are typical dimensional characteristics of the thickness of the bottom plate 12 of the feeder and a form of eyelet or tubular member welded to the plate, both the plate and members being formed of noble metal or alloys thereof such as platinum or a composition of platinum and rhodium or platinum and iridium.

The bushing floor 12 may approximately forty thousandths of an inch in thickness. The tubular tips or members 14 vary in dimension according to the bore or passage therethrough dependent upon the size of glass stream to be flowed through the tubular tip. For example, the tubular tip may be of an overall length of approximately one-hundred-seventy-five thousandths of an inch, the outside diameter of the flange 22 approximately one-hundred-thirty-five thousandths of an inch, the outside diameter of the tubular body portion 20 approximately one-hundred thousandths of an inch, and the interior bore or passage approximately seventy-five thousandths of an inch. The thickness of the wall of the tubular body portion is usually about twelve and one-half thousandths of an inch and the thickness of the flange 22 of about the same dimension. From these exemplary dimensions it will be seen that the tubular tips are of extremely small size and that a very short welding period is required to fuse the adjacent surfaces of the flange 22 and the plate 12 to form an effectively sealed joint. The welding time is critical as a welding time of extremely short duration will not form a completely fused or welded joint and an excessive welding time melts the comparatively thin flange 22 of a tip. It has been found that for tip members of the approximate dimensions herein given, a welding time of about one-sixtieth of a second provides a satisfactory weld. The welding time may be varied by electrically controlled timing means of conventional character depending upon the particular platinum alloy utilized and the thickness and area of the flange 22.

Figure 6 illustrates a modified from of tubular member or tip construction 70 having a body portion 72 and a flange portion 74. In this form, the circular flange 74 is flared from the body portion 72 at an angle B as shown in Figure 6. The angularity B of the flange 74 may be in the nature of approximately thirty degrees or less.

The method of welding the flange 74 to the feeder plate 12' is substantially the same as hereinbefore described in reference to the welding of the tubular members 14 to the plate 12 with the exception that upon initial fluid pressure applied against the piston in the cylinder 40, the tip or extremity 54' of the electrode 46' engages the flange 74 and bends it downwardly into a position wherein the surface 76 of the flange is in contiguous relation and intimate contact with the upper surface of the plate 12'. The resistance to current flow between the area of the surface 76 and the adjacent area of the plate 12' generates the heat for effecting the weld.

The method of welding of the invention has successfully produced a feeder plate or floor of a feeder 10 embodying a large number of tubular tips which are of uniform size so as to deliver streams of glass of uniform size from the feeder. After all of the tubular tips 14 are welded to the plate 12, the plate 12 is welded at the regions 17 to the side walls 15 and the end walls 16 as shown in Figures 1 and 2 to complete formation of the feeder or bushing 10. Through this method, the tubular tips 14 may be disposed in close relation so that in a comparatively small floor area of the plate 12, a large number of tubular tips may be embodied in the feeder floor or bottom wall 12.

It is apparent that, within the scope of the invention, modifications and different arrangements may be made other than is herein disclosed, and the present disclosure is illustrative merely, the invention comprehending all variations thereof.

We claim:

1. The method of securing tubular members formed of platinum in openings in a plate formed of platinum including the steps of inserting tubular members in openings in the plate, engaging the assemblage of plate and tubular members with a current conducting support, moving a current conducting electrode into contact with a member, exerting pressure on the electrode to establish intimate contact of a portion of the member with the plate, flowing electric current through the electrode, tubular member and plate for a regulated period of time whereby contiguous areas of the member and plate are welded together without expanding the tubular member, and maintaining pressure on the electrode for a regulated period of time after the flow of current is interrupted.

2. The method of securing flanged tubular members formed of platinum in openings in a plate formed of platinum including the steps of inserting tubular members in openings in the plate, engaging the assemblage of plate and tubular members with a current conducting support, moving a current conducting electrode into contact with the flange of a member, exerting pressure on the electrode to engage the flange of the member with the plate without expanding the tubular member, flowing electric current through the electrode, tubular member and plate for a regulated period of time whereby contiguous areas of the flange and plate are welded together, and maintaining pressure on the flange for a regulated period of time after the flow of current is interrupted.

3. The method of securing flanged tubular members formed of platinum in openings in a plate formed of platinum including the steps of inserting tubular members in the openings in the plate, mounting the assemblage of plate and tubular members upon a current conducting support, moving a current conducting electrode into contact with the flange of a member, exerting pressure on the electrode to squeeze the flange of the member into intimate contact with the plate, flowing electric current through the electrode, tubular member and plate for a regulated comparatively short period of time whereby contiguous areas of the flange and plate are fused without expanding the tubular member, and holding pressure on the flange for a regulated period of time after the flow of current is interrupted.

4. The method of securing flanged tubular members formed of platinum alloy in openings provided in a plate formed of platinum alloy including the steps of inserting tubular members in the openings with the flanges adjacent a surface of the plate, mounting the plate upon a current conducting supporting surface, moving an electrode into engagement with the flange of a tubular member, exerting pressure on the electrode to bring the flange into contiguous relation with adjacent surface area of the plate without expanding the tubular member, momentarily flowing electric energy through the electrode, tubular member, plate to fuse adjacent contacting areas of the flange and plate, and exerting pressure on the electrode for a comparatively short period of time to hold the fused regions under compression to complete the welding of the flange and the plate.

5. The method of securing flanged tubular members formed of platinum alloy in openings provided in a plate formed of platinum alloy including the steps of inserting tubular members in the openings with the flanges adjacent a surface of the plate, mounting the plate upon a current conducting supporting surface, moving an electrode into engagement with the flange of a tubular member, exerting pressure on the electrode to bring the flange into contiguous relation with the adjacent surface of the plate, momentarily flowing electric energy through the electrode, tubular member, plate and supporting surface to fuse adjacent contacting areas of the flange and plate without expanding the tubular member, exerting pressure on the electrode for a comparatively short period of time to hold the fused regions under compression to complete the welding of the flange and the plate, withdrawing the electrode from the tubular member, and successively performing the said series of steps upon each of the tubular members until all are welded to the plate.

6. The method of securing flanged tubular members formed of platinum alloy in openings provided in a plate formed of platinum alloy including the steps of disposing a perforated fixture in engaging relation with the plate with the perforations in the fixture in registry with the openings in the plate, inserting flanged tubular members in the openings in the plate and fixture with the flanges engaging a major surface of the plate, mounting the assembly of plate, fixture and tubular members upon a current conducting support, moving an electrode into engagement with the tubular members, exerting pressure on the electrode, flowing electric current of high amperage through the electrode, a flange of a tubular member in contact with the electrode and plate to weld the flange of a tubular member to the plate through resistance heat generated between the flange and the plate without expanding the tubular member, maintaining pressure on the electrode for a regulated period of time after cessation of current flow with the tubular member held under pressure, and withdrawing the electrode from engagement with the tubular member at the end of the pressure maintenance period.

7. The method of joining flanged tubular members formed of platinum alloy in openings in a plate of platinum alloy forming a component of a stream feeder for molten mineral materials including positioning the plate in contiguous contacting relation with a metal fixture having current conducting characteristics with the openings in the plate in registration with openings in the fixture, inserting flanged tubular members formed of platinum alloy in the registering openings in the plate and fixture with the flanges of the members in contiguous relation with a surface of the plate, moving an electrode into contact with the flange of one of the tubular members, exerting pressure upon the electrode for a regulated period of time prior to a welding operation, passing a current of electricity through the flange and plate for a regulated period of time whereby the adjacent surface areas of the flange and plate become fused without expanding the tubular member, maintaining pressure upon the electrode for a regulated period of time to complete the fusion of the said surface areas after cessation of current flow, withdrawing the electrode from engagement with the flange, and successively performing the said series of operations upon each of the tubular members to weld the flanges of the members to the plate.

8. The method of welding flanged tubular members formed of platinum alloy in openings in a plate formed of platinum alloy including positioning the plate in contiguous contacting relation with a metal fixture having current conducting characteristics with the openings in the plate in registration with openings in the fixture, inserting flanged tubular members formed of platinum alloy in the registering openings in the plate and fixture with the flanges of the members in contiguous relation with a surface of the plate, moving an electrode into contact with the flange of a tubular member, exerting pressure upon the electrode for a regulated period of time prior to a welding operation, passing a current of electricity through the flange and plate for a regulated period of time whereby the adjacent surface areas of the flange and plate become fused through heat resulting from resistance to current flow at the region of contact without expanding the tubular member, maintaining pressure upon the electrode for a regulated period of time to complete intimate fusion of the said surface areas after cessation of current flow, withdrawing the electrode from engagement with the flange, and successively performing the said series of operations upon each of the tubular members to weld the flanges of the members to the plate.

9. The method of forming an orificed receptacle for flowing streams of molten mineral material including the steps of positioning a flat perforated plate in contiguous contacting relation with a metal fixture having current conducting characteristics with the openings in the plate in registration with openings in the fixture, inserting flanged tubular members in the registering openings in the plate and fixture with the flanges of the members in contiguous relation with a surface of the plate, moving an electrode into contact with the flange of a tubular member, exerting pressure upon the electrode for a regulated period of time prior to a welding operation, passing a current of electricity through the flange and plate for a regulated length of time whereby the adjacent surface areas of the flange and plate are fused by resistance heat at said surface areas without expanding the tubular members, maintaining pressure upon the electrode for a regulated period of time to complete the integration of the fused metal at the said surface areas after cessation of current flow, withdrawing the electrode from engagement with the flange, successively performing the said operations upon each of the tubular members to weld the members to the plate, and welding side and end walls formed of platinum alloy to the plate to form the receptacle.

10. Apparatus for welding flanged tubular members formed of platinum alloy in openings in a plate formed of platinum alloy including, in combination, a current conducting platen, a fixture adapted to be supported upon the platen formed with openings arranged for registration with the openings in the plate to receive the tubular members, said fixture adapted to support the plate during welding operations, a relatively movable current conducting electrode having a planar surface arranged for successive engagement with the flanges only of the tubular members for electrically welding the flange of each member to the plate, and a pin associated with the platen extending from the fixture supporting surface thereof and adapted to project into one of the openings in the fixture for aligning a tubular member with the relatively movable electrode.

11. Apparatus for welding circular flanges of tubular members formed of platinum alloy to a major surface of a perforated plate formed of platinum alloy including, in combination, a current conducting platen, a fixture adapted to be supported upon the platen formed with openings arranged for registration with openings in the plate to receive the tubular members, said fixture adapted to support the plate during welding operations, a relatively movable current conducting electrode having a flat surface of a diameter substantially equal to that of a flange on a tubular member and arranged for successive contiguous engagement with the flanges of the tubular members for electrically welding the flange of each member to the adjacent surface area of the plate, and a pin carried by the platen extending from the fixture supporting surface thereof in alignment with the relatively movable electrode and adapted to project into one of the openings in the fixture for aligning a tubular member to be welded with the electrode.

References Cited in the file of this patent
UNITED STATES PATENTS

| | | |
|---|---|---|
| 1,538,590 | Randles | May 19, 1925 |
| 1,578,019 | Ellis et al. | Mar. 23, 1926 |
| 2,614,198 | Avery et al. | Oct. 14, 1952 |
| 2,824,212 | Roberts | Feb. 10, 1958 |